(12) United States Patent
Berger et al.

(10) Patent No.: US 8,602,250 B2
(45) Date of Patent: Dec. 10, 2013

(54) STORAGE VESSEL AND METHOD OF FORMING

(75) Inventors: Elisabeth J. Berger, Farmington Hills, MI (US); Chen-Shih Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 385 days.

(21) Appl. No.: 12/435,108

(22) Filed: May 4, 2009

(65) Prior Publication Data

US 2010/0276434 A1   Nov. 4, 2010

(51) Int. Cl.
*F17C 1/02* (2006.01)
*B05D 3/10* (2006.01)

(52) U.S. Cl.
USPC ..................................................... 220/586

(58) Field of Classification Search
USPC ......... 220/586–592, 4.12–4.17, 62.19, 62.22, 220/62.21, 592.26, 292.2, 560.124
See application file for complete search history.

(56) References Cited

U.S. PATENT DOCUMENTS

| 3,598,275 | A | * | 8/1971 | Francois | 220/586 |
| 4,588,622 | A | * | 5/1986 | Sukarie | 220/590 |
| 6,145,692 | A | * | 11/2000 | Cherevatsky | 220/581 |
| 6,547,092 | B1 | * | 4/2003 | Chervatsky | 220/581 |

OTHER PUBLICATIONS

Wozniak, John, "Development of a Compressed Hydrogen Gas Integrated Storage System (CH2-ISS) for Fuel Cell Vehicles", Hydrogen, Fuel Cells, and Infrastructure Technologies, FY 2003 Progress Report, May 20, 2003, US Department of Energy, www1.eere.energy.gov/hydrogenandfuelcells/pdfs/iiia2_wozniak.pdf, accessed May 1, 2009.

* cited by examiner

*Primary Examiner* — Andrew Perreault
(74) *Attorney, Agent, or Firm* — Cantor Colburn LLP

(57) ABSTRACT

A storage vessel, such as vessels used in storing high pressure gas is provided. The storage vessel includes a liner having a center portion and a first and second end dome. A first composite layer is disposed circumferentially about the center portion. A second composite layer is disposed about said first composite layer and the first and second end dome. In some embodiments, the second composite layer is formed from a knitted or braided sleeve that is tightened over the liner and first composite layer by pulling the sleeve.

12 Claims, 8 Drawing Sheets

STORAGE VESSEL AND METHOD OF FORMING

BACKGROUND OF THE INVENTION

The subject matter disclosed herein relates to a storage vessel, and in particular to a lower cost vessel using composite materials for storing a high-pressure gas.

High-pressure storage vessels are used for containing high-pressure gases in a variety of applications. For stationary and lower pressure applications, vessels made from a metal, such as aluminum or steel for example, are used as a low cost storage solution. Metal storage tanks are generally adequate for lower pressures, such as up to 2900 pounds per square inch ("psi") (20,000 kilopascals) for example. One disadvantage of metal tanks is their weight. Often special handling equipment, such as hand trucks or forklifts for example, is needed to move the metal vessels. Further, the pressure levels these tanks can contain are not adequate for all applications.

The weight of metal tanks also limits its usefulness in mobile applications. In some applications, such as hydrogen-powered vehicles, minimizing weight is important to avoid adversely impacting the operational range of the vehicle. Further, this type of vehicle would ideally target a tank pressure of up to 10,000 psi (68,948 kilopascals) or more, which is considerably above the operating range achievable by metal tanks.

To overcome these issues, tanks have been developed that incorporate both metal and composite materials to increase the operating pressure of the tank while also reducing weight. These tanks use a polymeric, aluminum or other metallic liner, about which a carbon fiber composite is filament wound around the liner to provide the strength needed for the operating pressures of the gas. The use of the carbon fiber composite with a relatively thin liner results in a low weight, high strength vessel capable of handing operating pressures up to or above 10,000 psi (68,948 kilopascals). Unfortunately, the filament winding process stresses the carbon fibers during the manufacturing process, which lowers the fibers' strength. As a result more expensive, aerospace grade carbon fibers are often used to provide adequate physical properties. Also, filament winding is a relatively slow process, adding cost to the vessel manufacture.

Accordingly, while existing composite storage vessels are adequate for their intended purposes, there remains a need for improvements, particularly in providing a lower cost, high pressure storage vessel for use in vehicle applications.

BRIEF DESCRIPTION OF THE INVENTION

According to one aspect of the invention, a storage vessel is provided. The storage vessel includes a liner having a center portion. A first composite layer is disposed circumferentially about the center portion. A second composite layer is disposed about the first composite layer.

According to another aspect of the invention, a method of forming a storage vessel is provided. The method includes forming a liner having a center portion with a first end dome on one end and a second end dome on an opposite end. A first composite layer is applied about the liner center portion. A second composite layer is applied about the first composite layer, the first end dome and the second end dome. The first composite layer and the second composite layer are then cured.

According to yet another aspect of the invention, a storage vessel is provided. The storage vessel includes a liner having a center portion having a first diameter. The liner includes a first end dome enclosing one end of the center portion and a second end dome enclosing an opposite end of the center portion. The first end dome and the second end dome have a second diameter, wherein the first diameter is smaller than the second diameter. A first composite layer is arranged having a third diameter disposed circumferentially about the center portion, wherein the third diameter is substantially equal to the second diameter, wherein the first composite layer is unidirectional carbon fiber pre-impregnated with an epoxy. A second composite layer is arranged having an inner diameter disposed circumferentially about the first composite layer, the first end dome and the second end dome, wherein the inner diameter is substantially equal to the second diameter.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
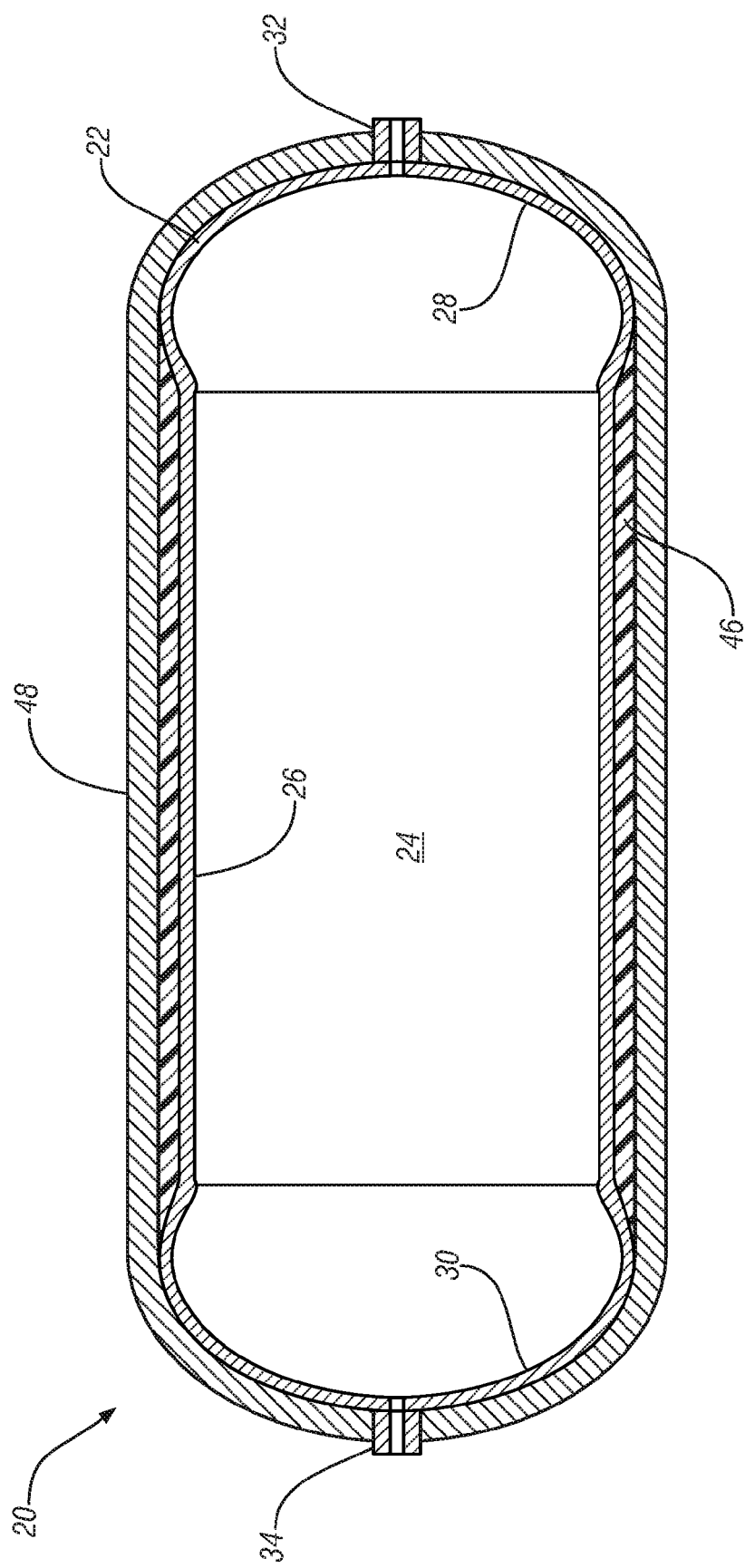
FIG. 1 is a side plan view, partially in section, of a storage vessel in accordance with an embodiment of the invention.
Figure 2:
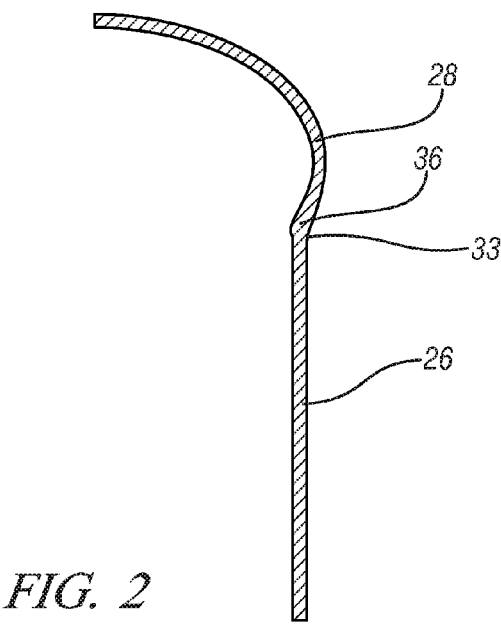
FIG. 2 is a partial side sectional view of a liner for the storage vessel of FIG. 1.

High pressure storage vessels are used in a variety of applications to hold gases, such as compressed hydrogen for example. An exemplary storage vessel 20 is illustrated in FIG. 1. The storage vessel 20 includes a liner 22 having a generally hollow interior portion 24. The liner 22 has a generally cylindrical center portion 26 with a pair of dome-shaped ends 28, 30 attached to either end. The domed ends 28, 30 may be attached to the center portion by any suitable technique, such as welding for example. In some embodiments, the domed ends 28, 30 and the center portion 26 are formed from a single piece, using processes such as machining for example. In the exemplary embodiment, the vessel 20 includes a transition region 36 between the domed ends 28, 30 and center portion 26 that includes a smooth fillet 33 as illustrated in FIG. 2. Each dome end 28, 30 includes a boss 32, 34 that is adapted to receive a valve member (not shown) to allow the stored gas to be transferred into and out of the storage vessel 20. It should be appreciated that while the embodiments herein describe the liner 22 as having two bosses 32, 34, the claimed invention should not be so limited. In some embodiments, a single boss may be used for transferring the stored gas into and out of the storage vessel 20.

It should be appreciated that while the embodiments described herein describe the storage vessel 20 as being generally cylindrical, the claimed invention should not be so limited. Other shapes, such as elliptical or oval for example, may also be suitable or desirable depending on the requirements of the application. Similarly, while the ends of the liner 22 are described as being "domes", the claimed invention should not be so limited. Other end shapes, such as but not limited to: spherical, conical, oblate spheroid, prolate spheroid or rectangular may be suitable or desirable depending on the requirements of the application.

Figure 3:
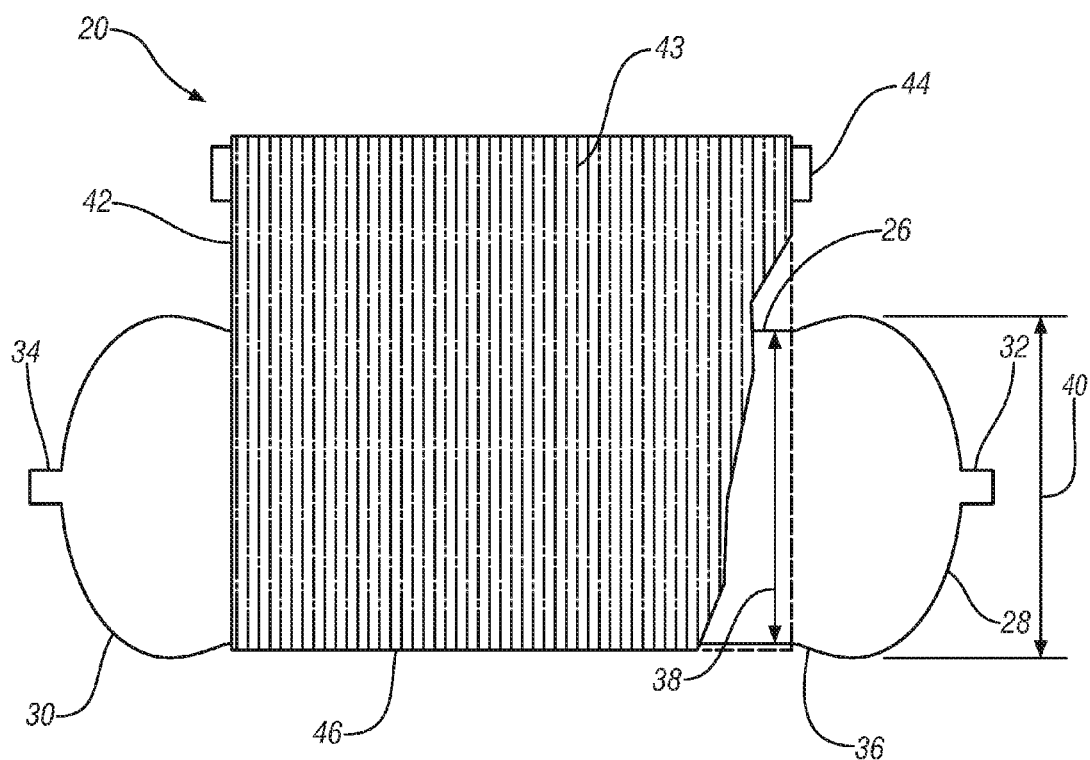
FIG. 3 is a side plan view of the storage vessel of FIG. 1 with a first composite layer being applied.

In the exemplary embodiment, the center portion 26 has a diameter 38 that is smaller than the diameter 40 of the dome ends 28, 30 as shown in FIG. 3. As discussed above, a transition region 36 is formed where the center portion 26 and the dome ends 28, 30 meet. The difference in the diameters 38, 40 may be up to one-inch (2.54 centimeters) or more. In the exemplary embodiment, the liner 22 is made from aluminum, such as a 6061 alloy for example. However, it should be appreciated that other liner materials may also be used, such as but not limited to thermoplastic materials such as high-density polyethylene for example.

A first composite layer 46 is disposed about the center portion 26 as shown in FIG. 3. In the exemplary embodiment, the first composite layer 46 is formed from a pre-impregnated ("prepreg") composite material, such as a sheet 42 made from an epoxy resin pre-impregnated with carbon fibers. The prepreg composite material may be acquired in the form of a unidirectional sheet. The first composite layer 46 is wrapped circumferentially around the center portion 26 by a device 44. The device 44 allows the sheet 42 to be continuously wrapped around the center portion 26 using a process sometimes referred to as roll-wrapping. The prepreg sheet 42 is typically 0.008 to 0.009 inches (0.2 to 0.23 millimeters) in thickness. In the exemplary embodiment, the sheet 42 is comprised of an epoxy resin with unidirectional industrial grade carbon fibers 43.

The use of the pre-impregnated sheet 42 provides advantages over the prior art filament winding about the center portion 26. The application of a carbon fiber composite using filament winding induces considerable stresses on the carbon fibers to the extent that some damage may occur. As a result, the strength of the carbon fiber is reduced. To compensate for this reduction in strength, higher strength carbon fibers may be used such that the end result has the desired properties. By using the pre-impregnated sheet 42 rather than a filament winding process, advantages may be gained in reducing the processing time and lowering the costs of capital equipment. Further, in some embodiments, a lower strength and less costly carbon fiber may be used, further decreasing costs.

Figure 4:
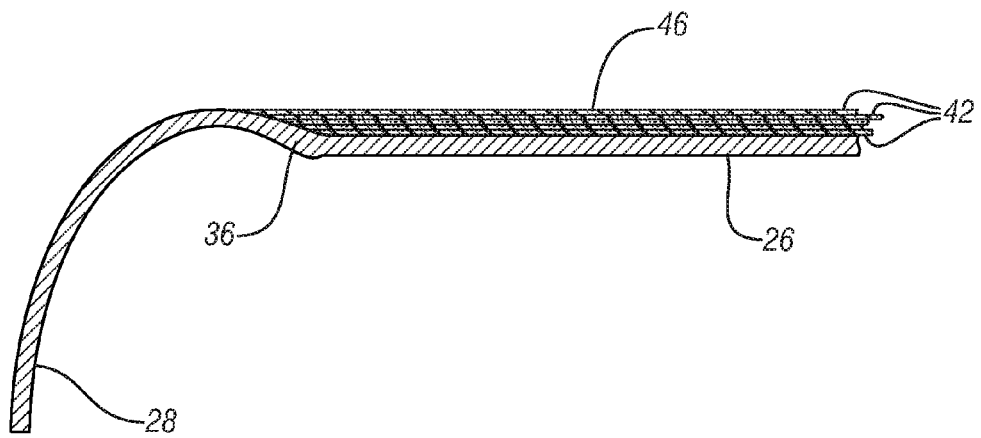
FIG. 4 is a partial side sectional view of the storage vessel of FIG. 1 with the first composite layer applied.

The sheet 42 is wrapped across the center portion 26 in multiple layers to form the first composite layer 46 having a thickness substantially equal to the difference between the dome diameter 40 and the center portion diameter 38. As shown in FIG. 4, successive layers of sheet 42 may have a gradually larger width, depending on the geometry of the transition, allowing the layer 46 to accommodate and overlap the transition region 36 as shown in FIG. 4. When the first composite layer 46 has been formed, the outer diameter of the first composite layer 46 is substantially equal to the diameter 40 of the end domes 28, 30 wherein there is substantially no discontinuity between the surface of the end domes 28, 30 and the first composite layer 46. Further, in one embodiment, the sheet 42 is applied "neat," meaning without resin, and the resin is applied with a resin-transfer process.

Figure 5:
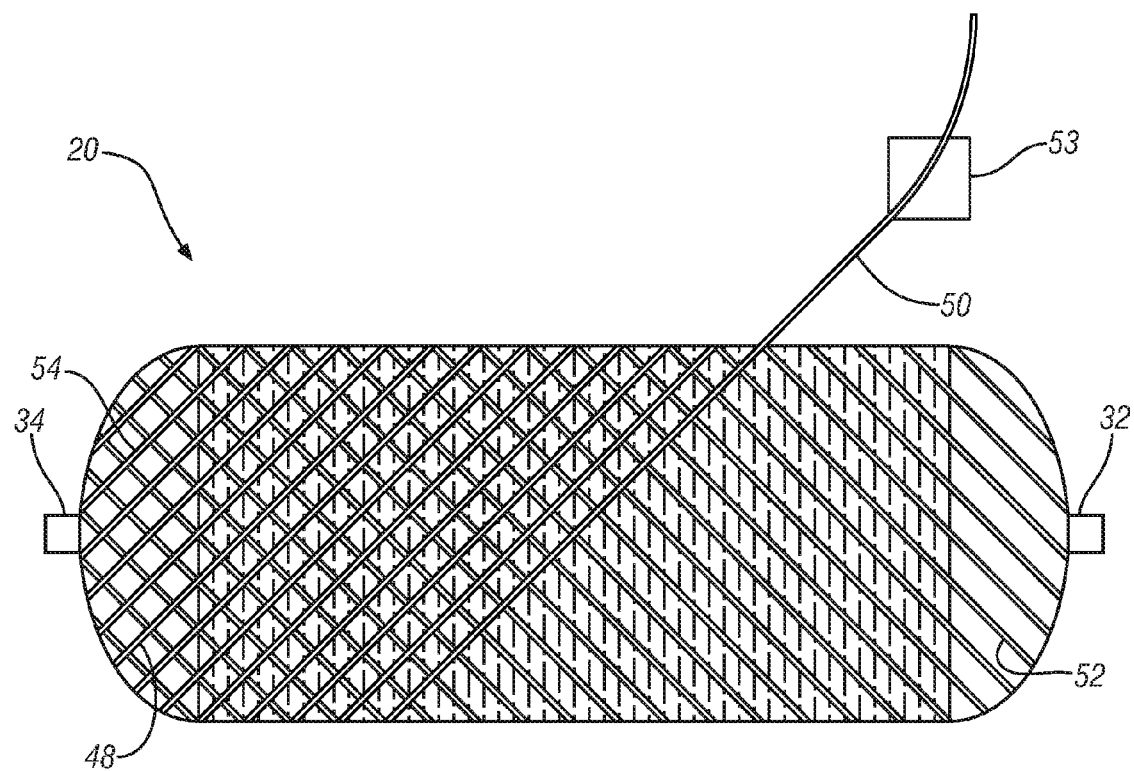
FIG. 5 is a side plan view of the storage vessel of FIG. 1 with a second composite layer being applied.

A second composite layer 48 is disposed around the first composite layer 46 and the end domes 28, 30. In one embodiment, the second composite layer 48 is a carbon fiber tow 50 that is applied by filament winding as shown in FIG. 5. The use of filament winding allows the carbon fiber to be wound to form a continuous layer over the first composite layer 46 and the end domes 28, 30. By limiting the filament winding process to the second layer 48, advantages may be gained in obtaining a lower cost storage vessel, faster fabrication times, and lower capital investment while maintaining a high-pressure storage capacity. In some embodiments, the method described herein may also allow for the use of lower cost fibers as well. In the embodiment of FIG. 5, the tow 50 is wrapped in a helical pattern over the first composite layer 46 and end domes 28, 30. The tow 50 is helically wrapped in a first direction 52, and then in a second direction 54. The wrapping of the tow 50 continues with layers alternating directions 52, 54 until a desired thickness is achieved. It should be appreciated that as the tow 50 passes over the end domes 28, the direction will change. In one embodiment, the tow 50 is pulled through a resin bath 53 in a wet wind process. In another embodiment, the tow 50 is pre-impregnated with resin. Further, in another embodiment, the carbon fiber tow is applied "neat," meaning without resin, and the resin is applied with a resin-transfer process.

Figure 6:
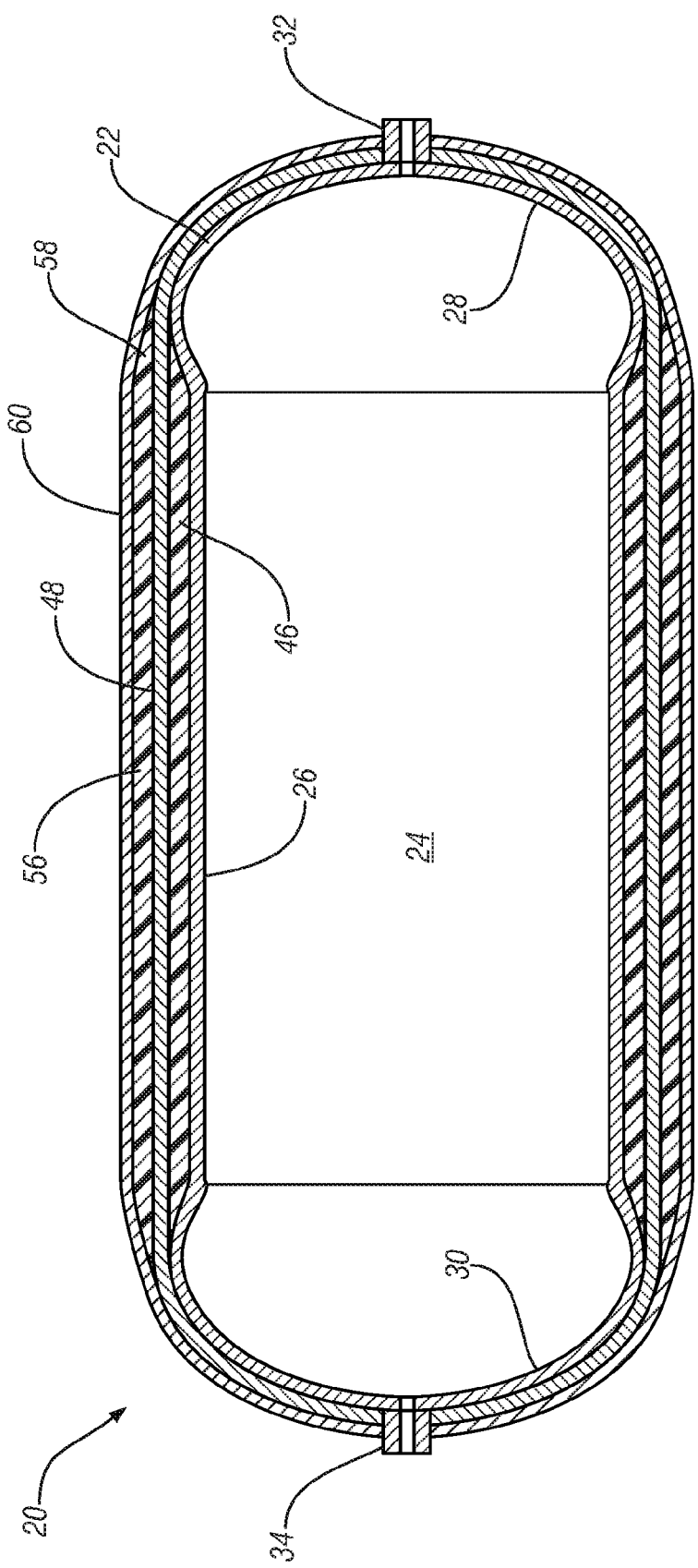
FIG. 6 is a side plan view partially in section of the storage vessel of FIG. 1 having multiple composite layers.

It should be appreciated that if additional strength is needed for the operating pressures of the storage vessel 20, additional composite layers may be applied as shown in FIG. 6. In this embodiment, a third composite layer 56 is applied around the center portion 26. The third composite layer 56 may include a tapered portion 58 that facilitates a smooth wrapping of the fourth layer 60 around the second composite layer 48 and the third composite layer 56. In this embodiment, the third composite layer 56 is a pre-impregnated epoxy carbon fiber sheet and the fourth composite layer 56 is applied by filament winding as described above.

Figure 7:
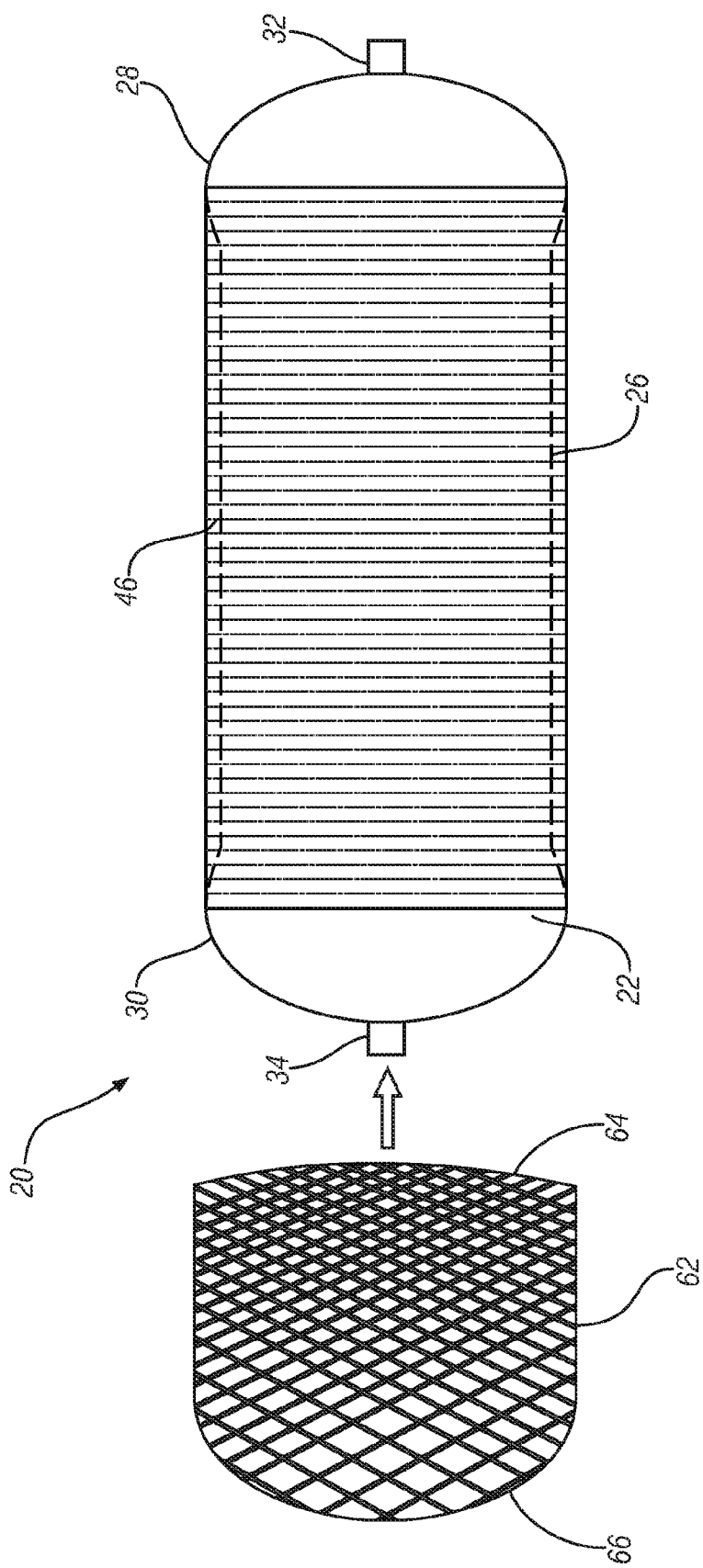
FIG. 7 is a side plan view of the storage vessel of FIG. 1 with another embodiment second composite layer being applied.
Figure 8:
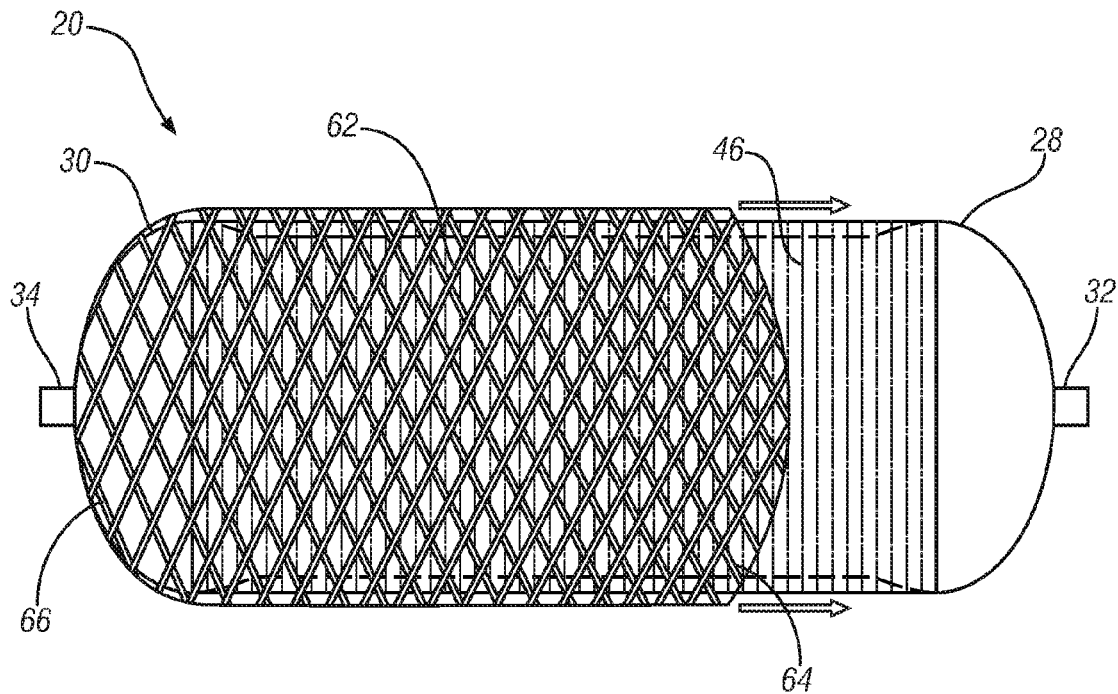
FIG. 8 is a side plan view of the storage vessel of FIG. 7 with the second composite layer being applied.
Figure 9:
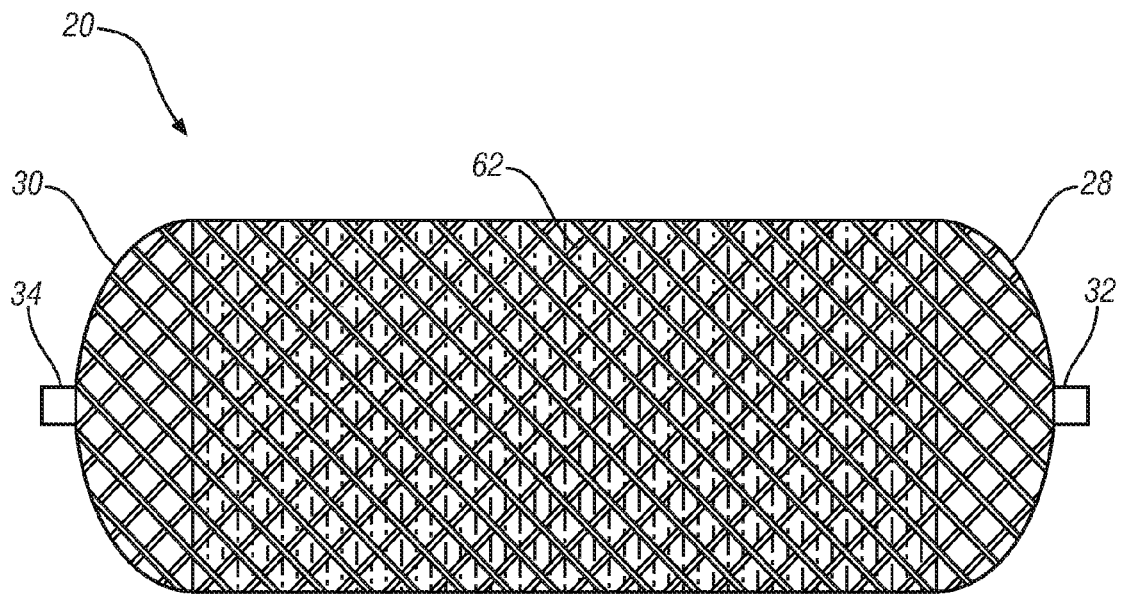
FIG. 9 is a side plan view of the storage vessel of FIG. 7 with the second composite layer fully applied.

Another embodiment of the storage vessel 20 is shown in FIGS. 7-9. In this embodiment, the liner 22 has center portion 26 and end domes 28, 30 on each end as described above. The first composite layer 46 disposed about the center portion 26 such that the outer diameter of the first composite layer 46 is substantially the same diameter of the end domes 28, 30 such that there are substantially no discontinuities between the outer diameter of the first composite layer 46 and the end domes 28, 30. A sleeve 62 is disposed around the liner 22 and the first composite layer 46. In one embodiment, the sleeve 62 is formed from a fiber tow, such as carbon fiber composite or glass fiber tow for example. The sleeve 62 may be fabricated by either knitting or braiding, such as a biaxial braid for example, the carbon fiber material into the desired shape. The sleeve 62 has a first end 64 and a second end 66.

To apply the sleeve 62 over the liner 22 and the first composite layer 46, the end 64 of the sleeve 62 is first pulled over the end dome 30 and the center portion 26 as in FIG. 8. As the sleeve 62 is pulled, the diameter of the sleeve narrows. The length of the sleeve 62 is gained by pulling the fiber towards the longitudinal direction of the vessel, thus changing the angle between the carbon fiber tows at their crossing points. This, in turn, causes the reduction in the circumference of the sleeve 62. The more the sleeve 62 is pulled, the more the circumference shrinks until the sleeve 62 is tight around the underlying layer and closed over the end dome 28 as shown in FIG. 9. It should be appreciated that when the sleeve is in the final position shown in FIG. 9, an opening (not shown) remains to allow the bosses 32 and 34 to extend through. In one embodiment, the sleeve 62 is tightened by pulling both ends 64, 66 after the sleeve 62 is positioned over the liner 22 and first composite layer 46. In another embodiment, the second end 66 is closed, and the sleeve 62 is tightened as the sleeve 62 is pulled over the liner 22 and first composite layer 46.

Figure 10:
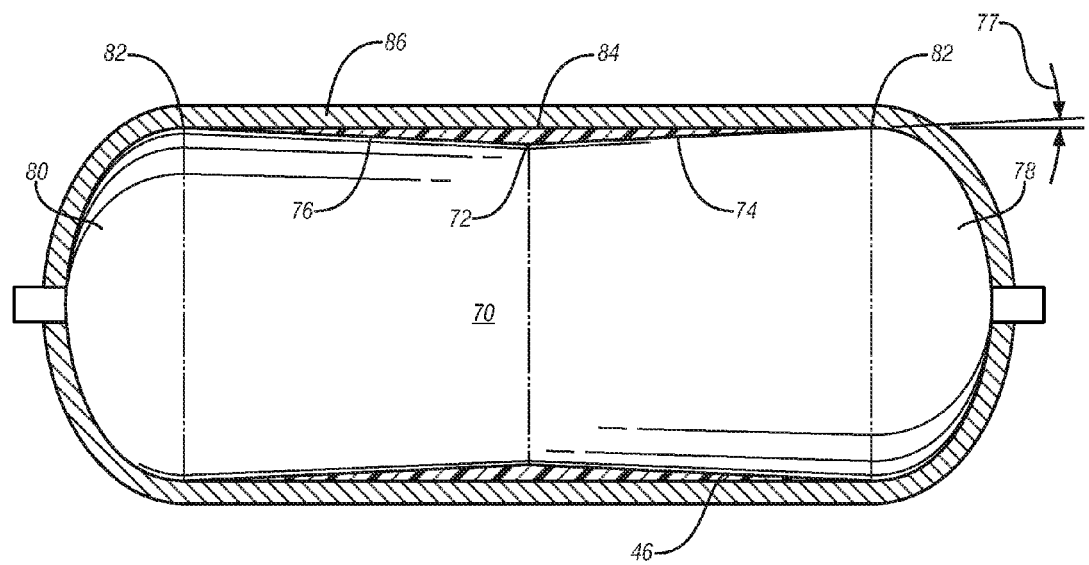
FIG. 10 is a side plan view, partially in section, of a storage vessel in accordance with another embodiment of the invention.

Another embodiment storage vessel 68 is illustrated in FIG. 10. In this embodiment, the liner 70 has a center portion 72 with two conical portions 74, 76. The conical portions 74, 76 are narrowest at the middle of the center portion 72 and increase in diameter at an angle 77 as the center portion 72 extends towards the end domes 78, 80 and the transition area 82. In one embodiment, the conical portions are arranged such that the diameter of the end of the conical portions 74, 76 is substantially equal to the diameter of the end domes 78, 80.

Similar to the embodiments described above, the storage vessel 86 includes a first composite layer 84. The first composite layer 84 is formed from prepreg carbon fiber sheet that is wrapped circumferentially about the center portion 72. The first composite layer 84 is applied such that the outer diameter of the first composite layer 84 is substantially equal to the diameter of the end domes 78, 80. This results in substantially no discontinuities between the outer diameter of the first composite layer 84 and the end domes 78, 80.

The storage vessel 68 also includes a second composite layer 86 that is applied over the first composite layer 84 and the end domes 78, 80. The second composite layer 86 may be applied by a filament wind process as described above with respect to FIGS. 1-3, or may be a sleeve that is formed from knitted or braided carbon fiber tow. Further, the first and second composite layers 84, 86 may be applied with neat carbon fibers and then impregnated with resin through a resin transfer process.

Figure 11:
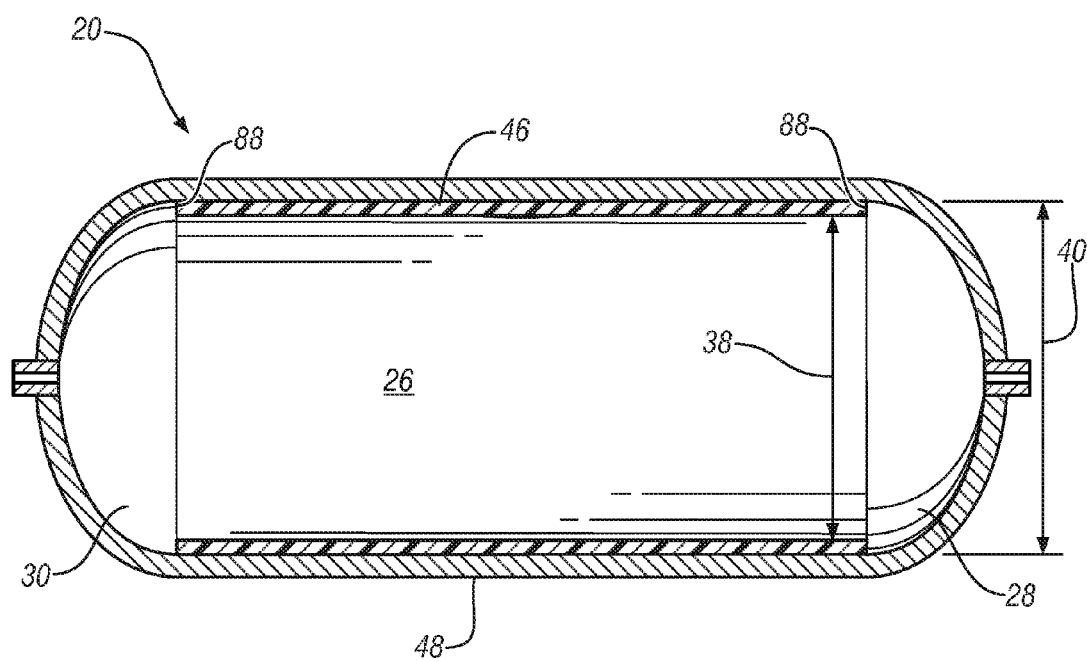
FIG. 11 is a side plan view, partially in section, of a storage vessel in accordance with another embodiment of the invention; and, FIG. 12 is a block diagram of a method for fabricating the storage vessel of FIG. 1, FIG. 10, and FIG. 11.

Another embodiment storage vessel 20 is illustrated in FIG. 11. In this embodiment, the liner 22 includes a smaller transition area 88. The size of the transition area 88 is the difference between the outer diameter 38 of the center portion 26 and the outer diameter 40 of the dome ends 28, 30. The dome ends 28, 30 may have a larger wall thickness than the center portion 26 to accommodate the smaller transition area 88. The first composite layer 46 has a substantially uniform thickness along the center portion 26 with the outer diameter of the first composite layer being substantially equal to the outer diameter 40 of end domes 28, 30 such that there is little or no discontinuity between the outer surface of the first composite layer 46 and the outer surface of the end domes 28, 30. The second composite layer 48 is arranged over the first composite layer 46 and the end domes 28, 30 as discussed above.

It should be appreciated that the transition areas 36, 82, 88 illustrated herein are exemplary and not intended to be limiting. Other transition regions having a different shape or size may also be used depending on the application in which the storage vessel is intended to be used.

Figure 12:
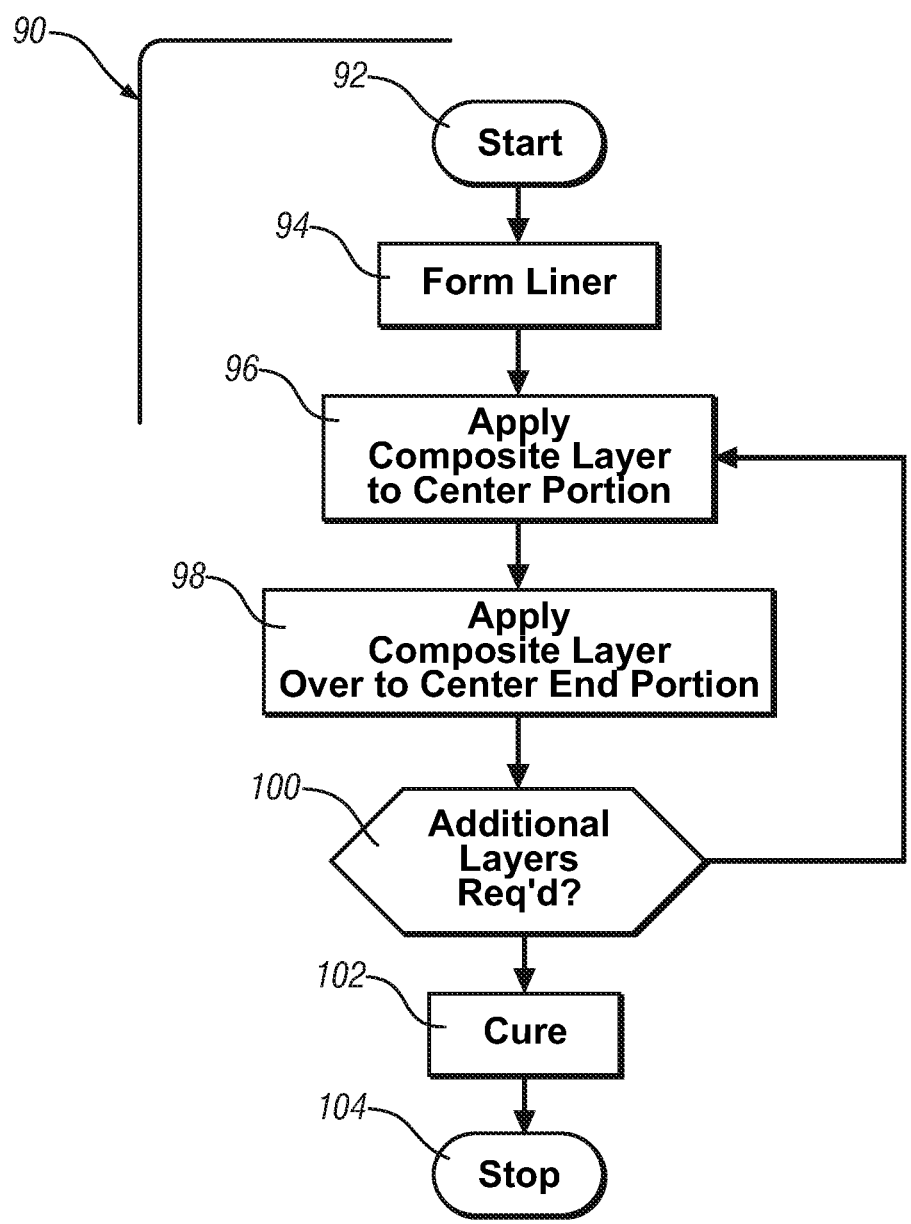

A method 90 of fabricating a storage vessel, such as those illustrated in FIGS. 1-10 for example, is shown in FIG. 12. The method 90 starts in block 92 and proceeds to block 94 where the liner is formed. The liner, such as liners 22, 70 discussed above for example, may be formed by any suitable process, including but not limited to forging, stamping, machining and the like. The method 90 then proceeds to block 96 where the first composite layer, such as layer 46 for example, is applied. In the exemplary embodiment, the first composite layer is applied by wrapping a prepreg sheet, such as prepreg sheet 42 for example, circumferentially about the center portion 26.

The method 90 then proceeds to block 98 where the second composite layer, such as layer 48 for example, is applied over the first composite layer and the end domes, such as first composite layer 46 and end domes 28, 30 for example. The second composite layer may be applied by filament winding, or be formed from a knitted or braided sleeve. Once the second composite layer is applied, the method 90 proceeds to query block 100 where it is determined whether additional layers are required, such as the storage vessel 20 shown in FIG. 6 for example. If query block 100 returns a positive, the method 90 loops back to block 96 where additional composite layers are applied in blocks 96, 98.

If query block 100 returns a negative, meaning the desired number of composite layers has been achieved, the method 90 proceeds to block 102 where the composite materials in the first composite layer and the second composite layer are cured. It should be appreciated that in embodiments using "neat" fiber, the process may include additional steps for application of the fiber sheet and the transfer of resin prior to curing. In some embodiments, curing requires that the storage vessel be placed under pressure. In some embodiments, the curing step may also require the application of heat to the storage vessel. In other embodiments, the curing may occur at ambient temperature. It should be appreciated that the temperature and pressure will be defined by the composite material used in the first and second composite layers. Once the storage vessel is cured, the method 90 proceeds to block 104 where the method 90 terminates.

As disclosed, some embodiments of the invention may include some of the following advantages: an ability to utilize lower cost lower strength carbon fibers; the ability to use different types of composite materials in combination; manufacturing times may be reduced through the use of roll wrapping unidirectional prepreg sheets and knitted or braided sleeves; lower capital costs in establishing manufacturing facilities using prepreg tape and knitted or braided sleeves.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A storage vessel comprising:
   a liner having a center portion with a first end portion and a second end portion, wherein said first end portion and second end portion are positioned on opposite ends of said center portion, wherein said center portion has a smaller diameter than said first end portion and second end portion, wherein said center portion has substantially the same diameter along its length, and wherein said liner further includes a first transition area between said center portion and said first end portion and a second transition area between said center portion and said second end portion;

a first composite layer comprising a pre-impregnated fiber composite material comprising a sheet of unidirectional fibers embedded in a polymeric resin with said fibers disposed circumferentially about said center portion, said first transition area and said second transition area, wherein said first composite layer has a thickness equal to the difference in the radius between said center portion and said first end portion and said second end portion; and, a second composite layer disposed about said first composite layer.

2. The storage vessel of claim 1 wherein said first composite layer comprises a sheet made from said pre-impregnated fiber composite material.

3. The storage vessel of claim 1 wherein said second layer is wound on said storage vessel by filament winding, wherein said filament winding has a helical pattern.

4. The storage vessel of claim 1 wherein said second layer is a knitted sleeve fabricated from a pre-impregnated carbon fiber tow.

5. The storage vessel of claim 1 wherein said second layer is a braided sleeve fabricated from a pre-impregnated carbon fiber tow.

6. The storage vessel of claim 1 further comprising:
a third composite layer disposed circumferentially over said second composite layer about said center portion; and,
a fourth composite layer disposed about said third composite layer and said first and second end dome.

7. The storage vessel of claim 1 wherein said first transition area tapers from an area adjacent said first end portion to a second area substantially towards the longitudinal center of said center portion.

8. A storage vessel comprising:
a liner having a center portion having a first diameter, said liner having a first end dome enclosing one end of said center portion and a second end dome enclosing an opposite end of said center portion, said first end dome and said second end dome having a second diameter, wherein said first diameter is smaller than said second diameter, wherein said center portion has substantially the same diameter along its length;

a first composite layer having a third diameter disposed circumferentially about said center portion, wherein said third diameter is substantially equal to said second diameter, wherein said first composite layer comprises a composite material comprising a sheet of unidirectional, circumferentially-disposed, carbon fibers pre-impregnated with an epoxy; and, a second composite layer having an inner diameter disposed circumferentially about said first composite layer, said first end dome and said second end dome, wherein said inner diameter is substantially equal to said second diameter.

9. The storage vessel of claim 8 wherein said second composite layer is formed from a knitted pre-impregnated tow.

10. The storage vessel of claim 8 wherein said second composite layer is formed from a braided pre-impregnated tow.

11. The storage vessel of claim 8 wherein said second composite layer is formed by filament winding a carbon fiber with epoxy resin material.

12. The storage vessel of claim 8 wherein said second composite layer is formed from neat fiber impregnated through a resin transfer process.

* * * * *